US010269155B1

(12) United States Patent
Brailovskiy et al.

(10) Patent No.: US 10,269,155 B1
(45) Date of Patent: Apr. 23, 2019

(54) IMAGE ARTIFACT MASKING

(71) Applicant: Amazon Technologies, Inc., Seattle, WA (US)

(72) Inventors: Ilya Vladimirovich Brailovskiy, Mountain View, CA (US); Paul Berenberg, Los Altos, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 47 days.

(21) Appl. No.: 14/753,084

(22) Filed: Jun. 29, 2015

(51) Int. Cl.
 G06T 3/40 (2006.01)
 G06T 5/00 (2006.01)
 G06T 5/50 (2006.01)
 G06T 11/60 (2006.01)
 H04N 5/232 (2006.01)

(52) U.S. Cl.
 CPC ............ *G06T 11/60* (2013.01); *G06T 3/4038* (2013.01); *G06T 5/005* (2013.01); *G06T 5/50* (2013.01); *H04N 5/23238* (2013.01); *G06T 2200/32* (2013.01); *G06T 2207/10016* (2013.01); *G06T 2207/20221* (2013.01)

(58) Field of Classification Search
 None
 See application file for complete search history.

(56) References Cited

U.S. PATENT DOCUMENTS

| 2004/0004626 | A1* | 1/2004 | Ida .......................... G06T 11/60 345/626 |
| 2011/0066984 | A1* | 3/2011 | Li ........................ G06F 3/04883 715/863 |
| 2012/0170805 | A1* | 7/2012 | Brown ............... G06K 9/00778 382/103 |
| 2014/0072231 | A1* | 3/2014 | S V ....................... G06T 3/4038 382/199 |
| 2015/0070523 | A1* | 3/2015 | Chao .................. H04N 5/23216 348/218.1 |
| 2016/0295108 | A1* | 10/2016 | Cao .................... H04N 5/23238 |

OTHER PUBLICATIONS

Kolor, Patching the nadir—Autopano , Apr. 5, 2015.*
PhotoShop, "Photoshop Elements Help _ Moving and copying selections", Oct. 2014, PhotoShop.*

* cited by examiner

*Primary Examiner* — YuJang Tswei
(74) *Attorney, Agent, or Firm* — Pierce Atwood LLP

(57) ABSTRACT

Devices, systems and methods are disclosed that detect and mask visual artifacts in image and video data. Such artifacts may result from stitching segments of images from two different cameras due to the parallax effect. In this respect, stitching errors may be determined and compared to a threshold to decide whether an area results in an undesirable artifact that should be masked. Such artifacts may then be masked with various graphical elements such as artistic type objects/images to provide a pleasant looking image to a viewer.

22 Claims, 14 Drawing Sheets

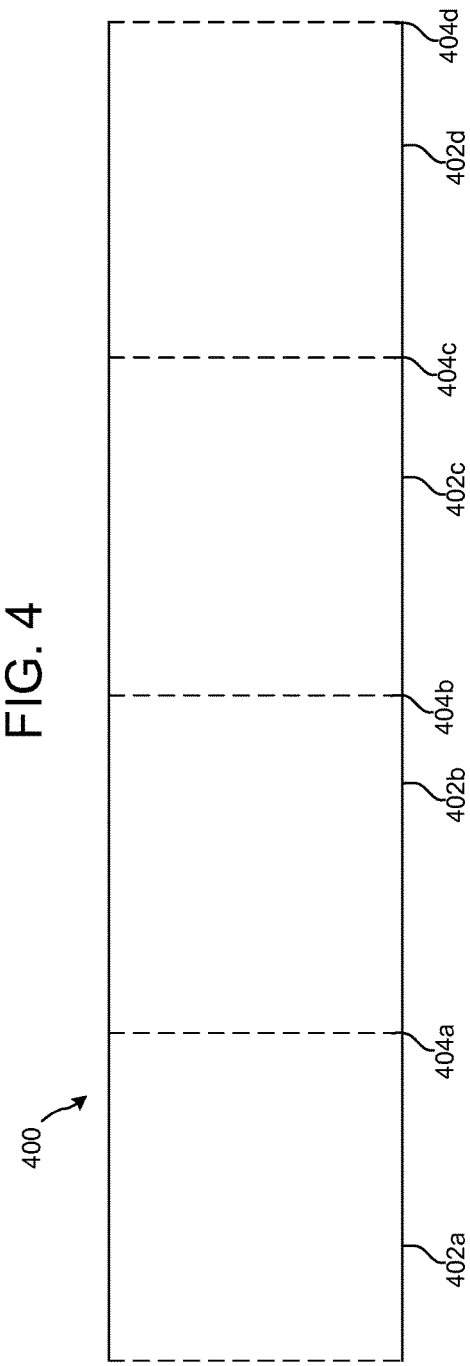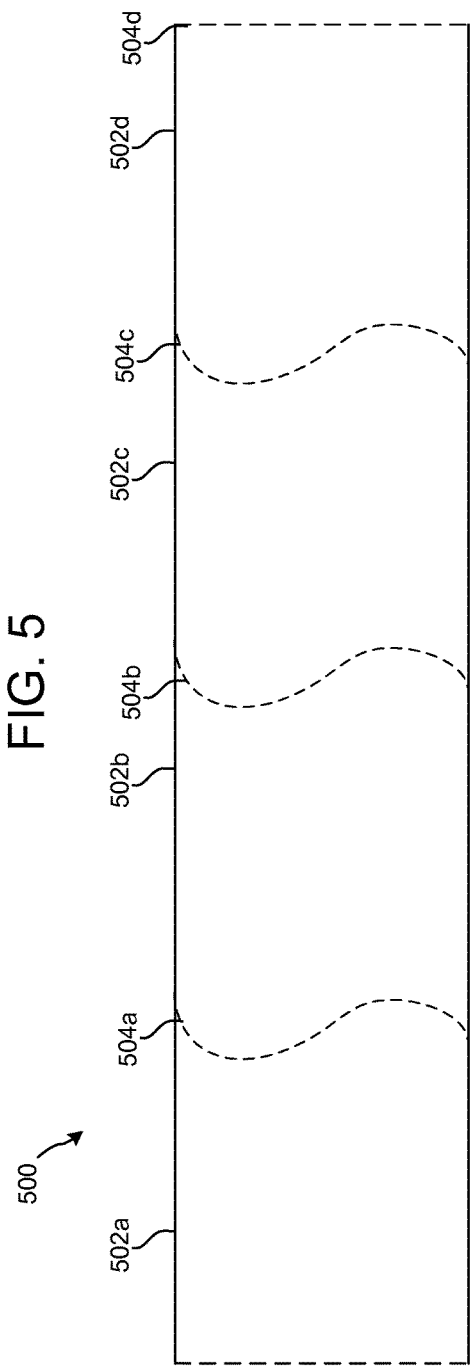

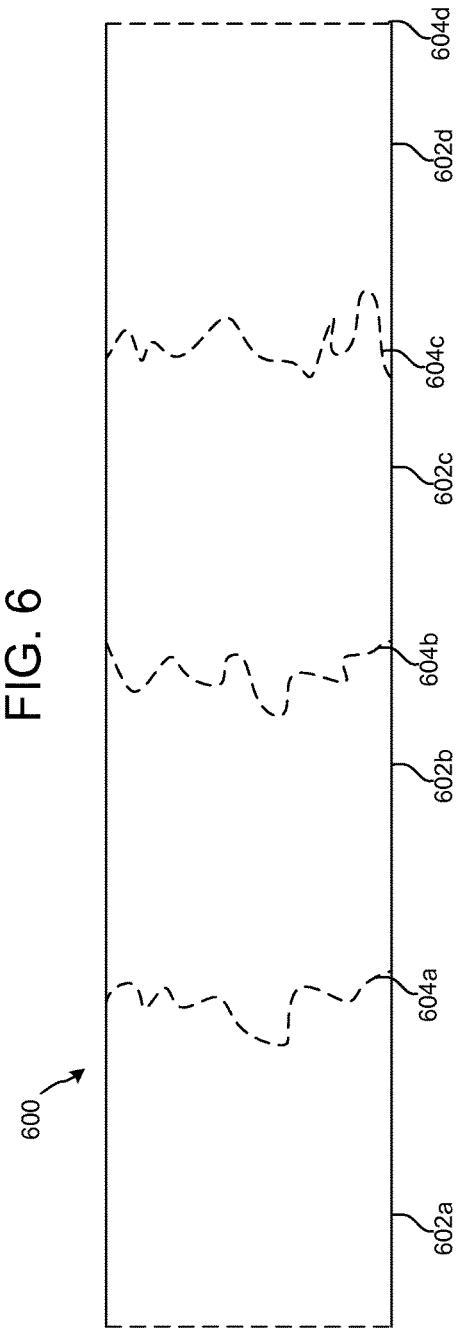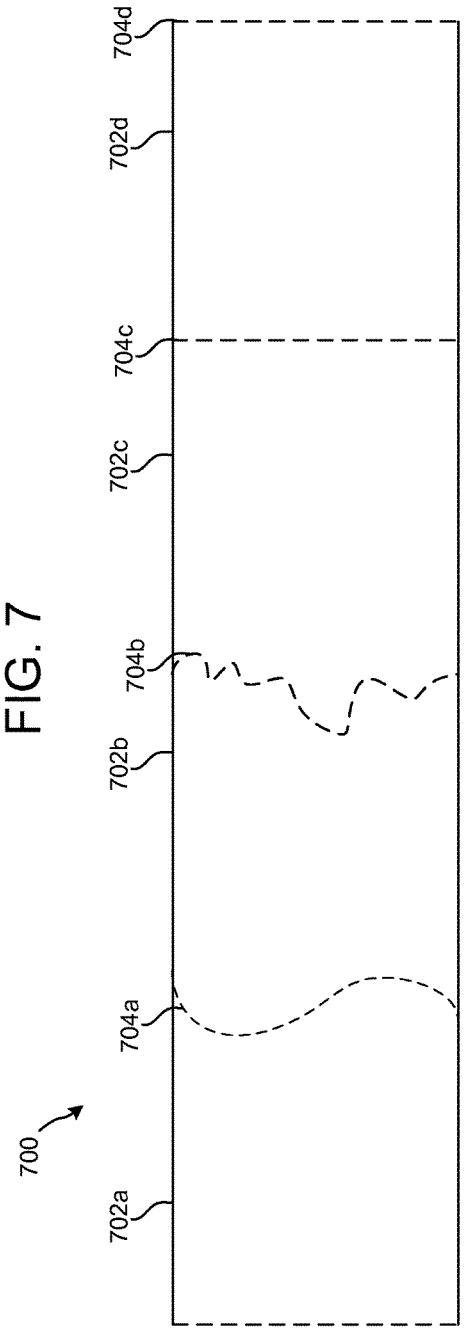

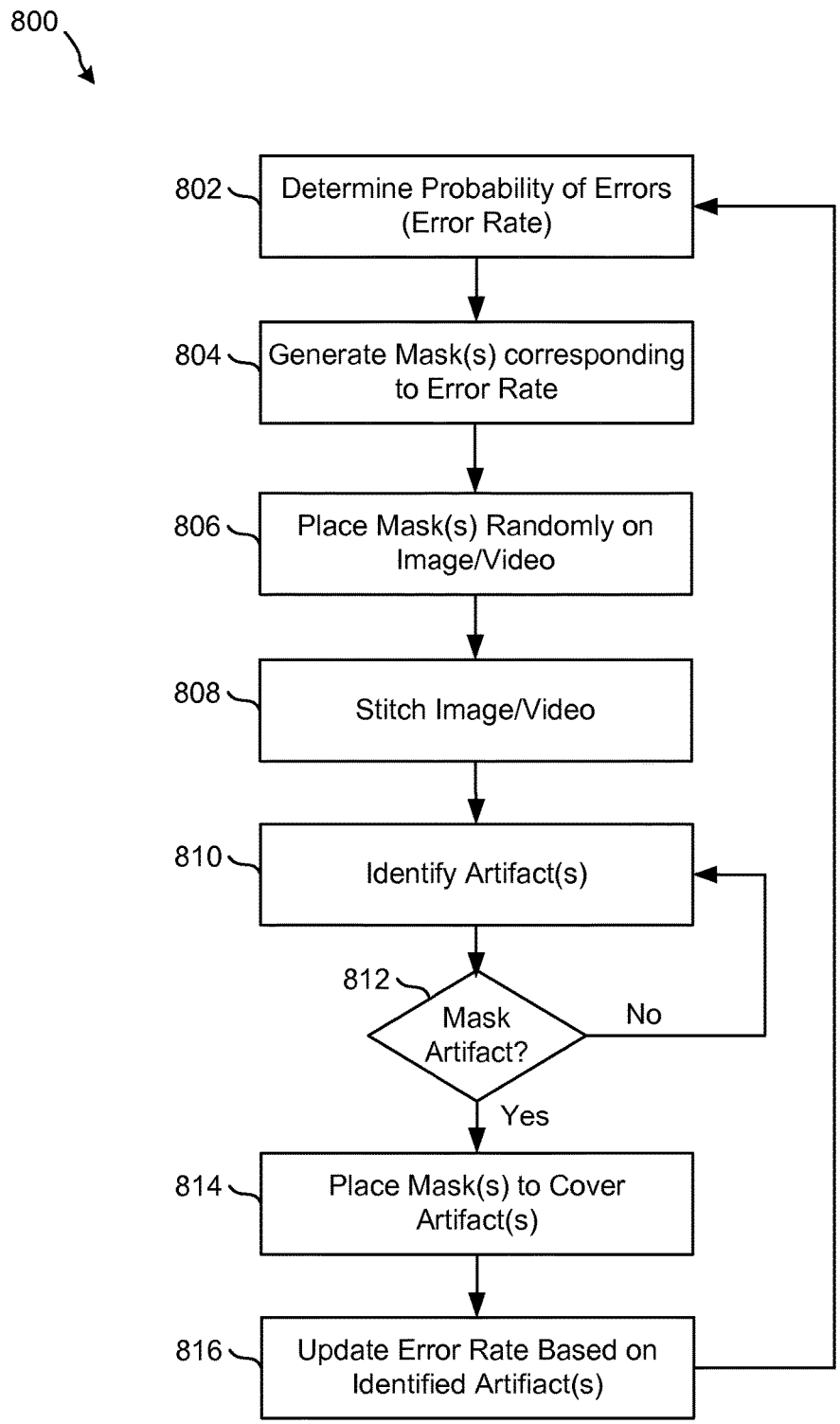

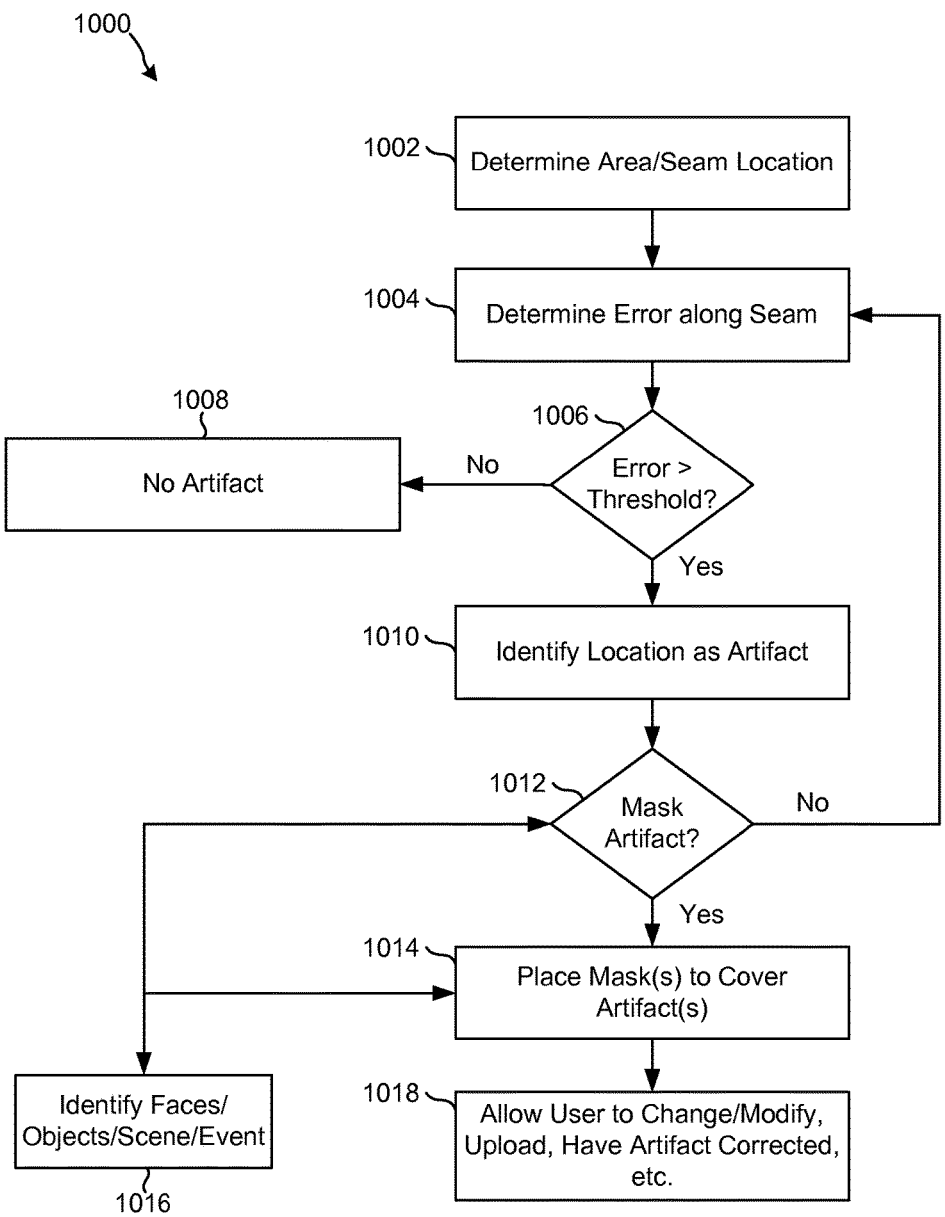

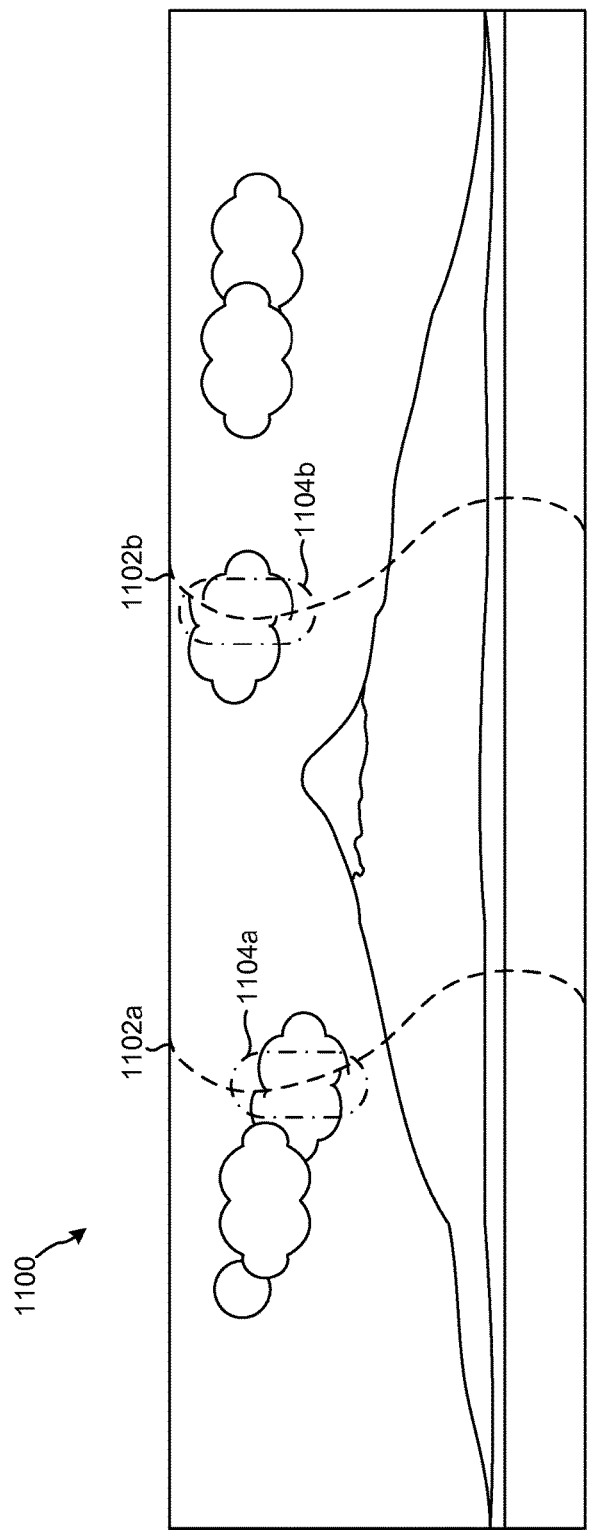

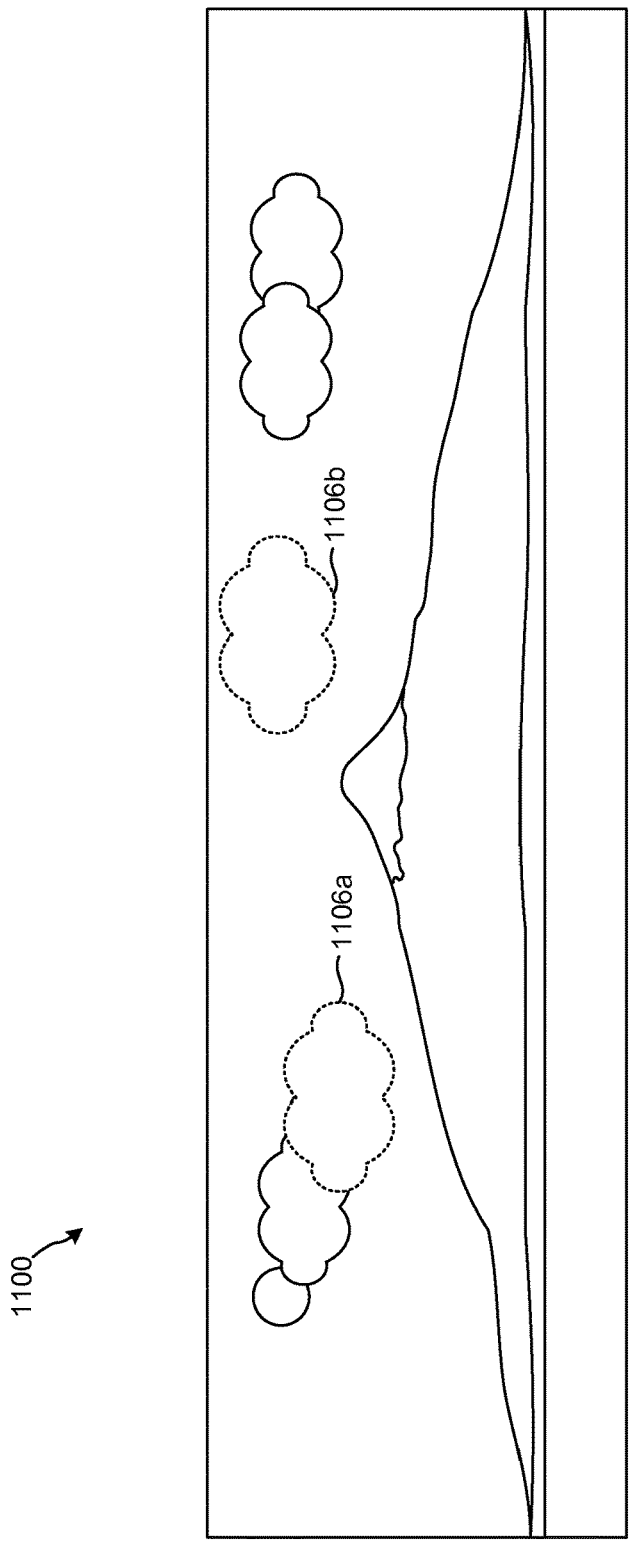

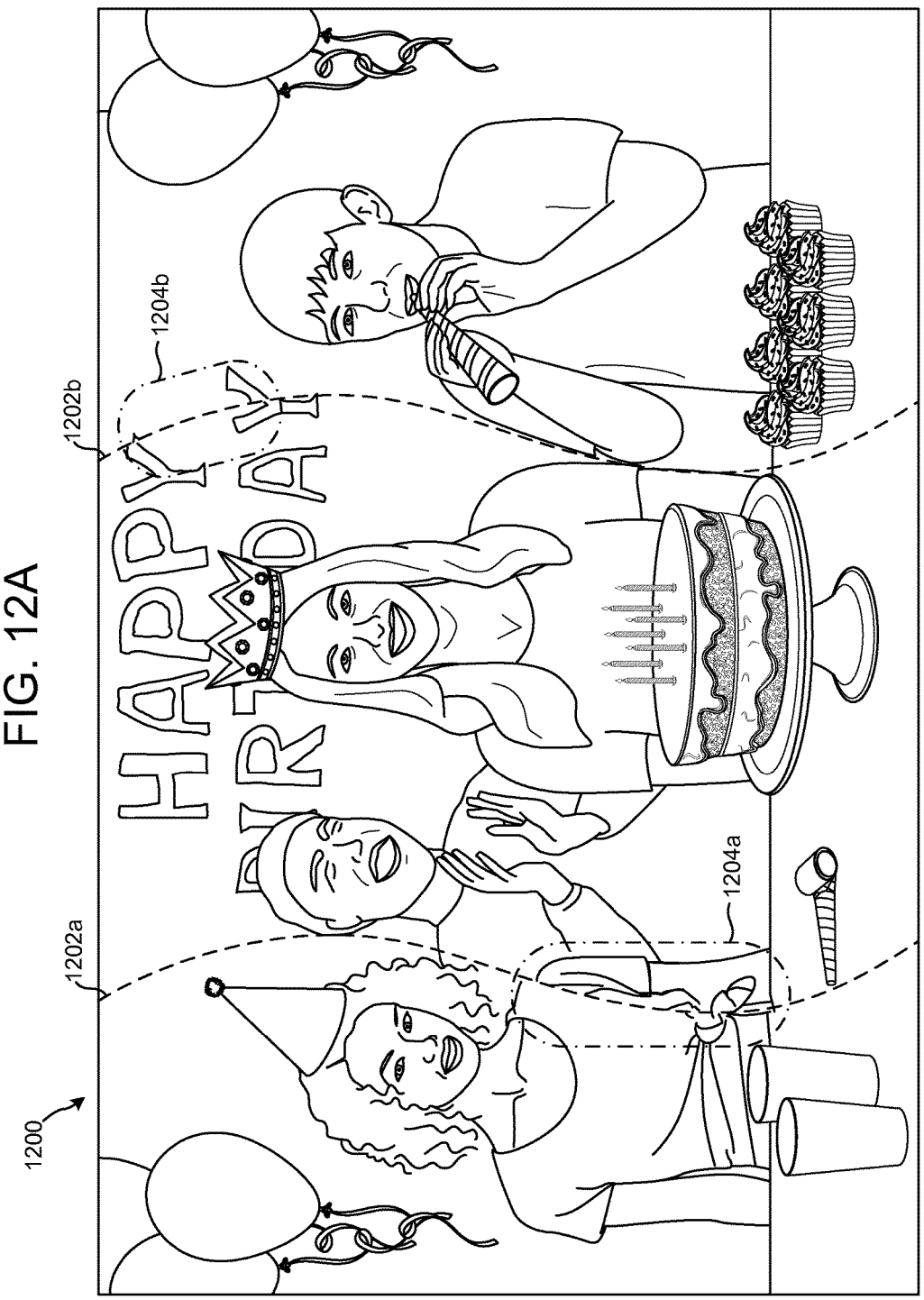

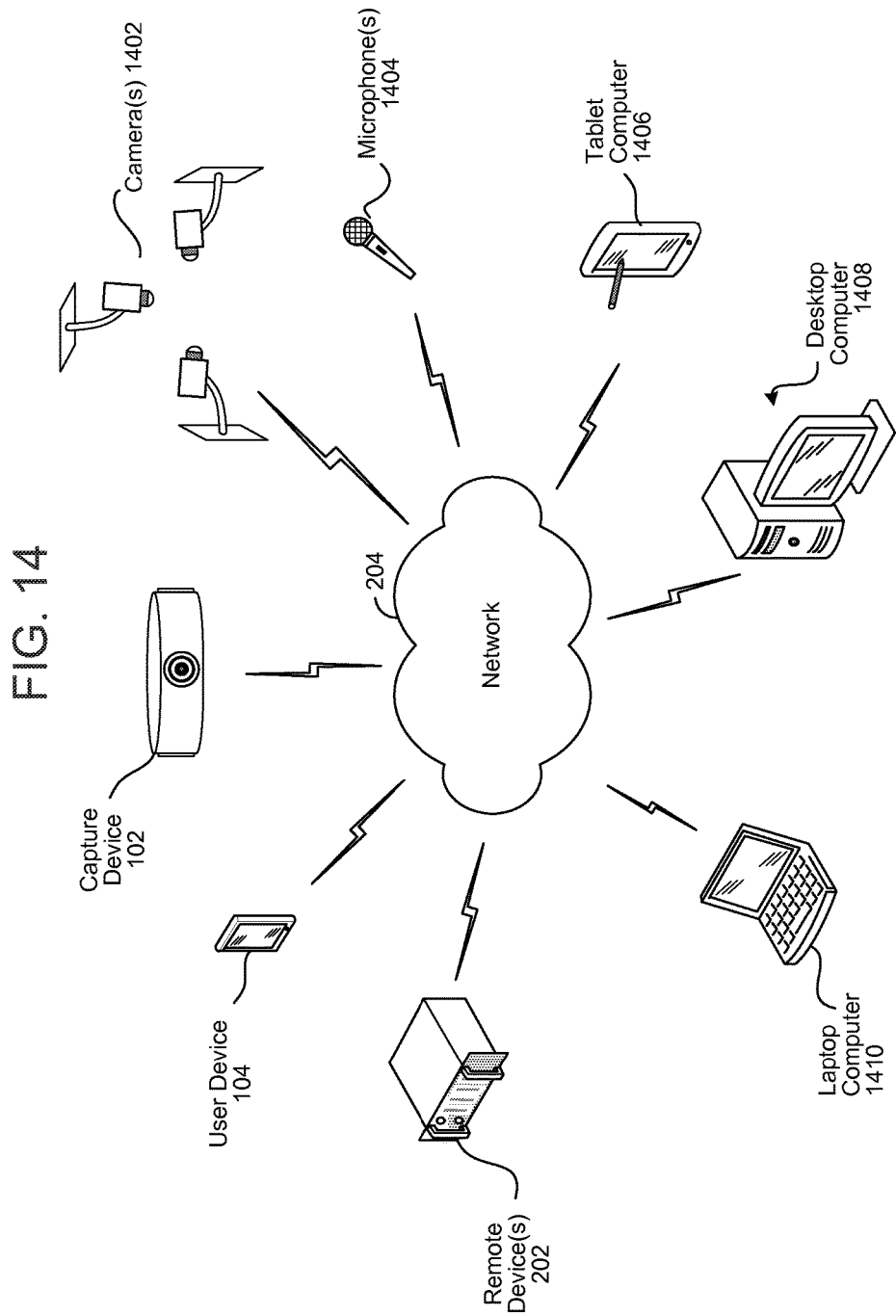

IMAGE ARTIFACT MASKING

BACKGROUND

With the advancement of technology, the use and popularity of electronic devices has increased considerably. Electronic devices are commonly used to capture image and video data using one or more cameras. In some situations, the data may be captured using multiple cameras to provide a panoramic or 360 degree view.

BRIEF DESCRIPTION OF DRAWINGS

For a more complete understanding of the present disclosure, reference is now made to the following description taken in conjunction with the accompanying drawings.

FIGS. 4-7 illustrate exemplary stitching seams according to embodiments of the present disclosure.

FIG. 8 illustrates an exemplary method according to embodiments of the present disclosure.

FIG. 10 illustrates another exemplary method according to embodiments of the present disclosure.

FIG. 11A illustrates an exemplary image with artifacts according to embodiments of the present disclosure.

FIG. 11B illustrates the exemplary image of FIG. 11A with the artifacts masked according to embodiments of the present disclosure.

FIG. 12A illustrates another exemplary image with artifacts according to embodiments of the present disclosure.

FIG. 14 illustrates a network for use with distributed processing according to embodiments of the present disclosure.

DETAILED DESCRIPTION

Figure 1:
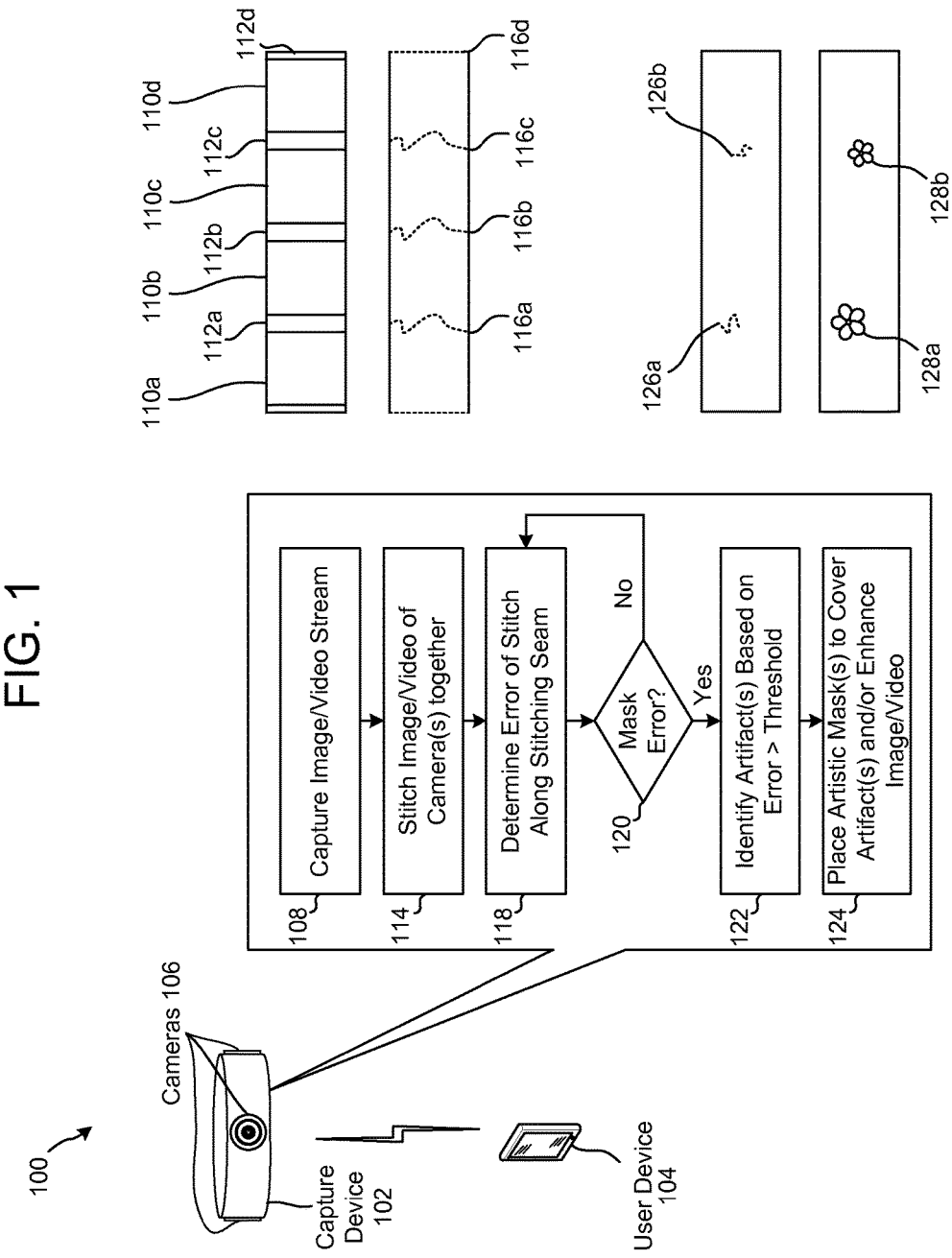
FIG. 1 illustrates an overview of a method for implementing embodiments of the present disclosure.

Electronic devices are commonly used to capture image data (which may include video data) using one or more cameras. To capture a scene or event in a panoramic or 360 degree image, the image segments from each camera with overlapping fields of view may be combined together to produce a segmented panorama or similar image (referred to herein as stitching). Various stitching algorithms have different performance in terms of their reduction of errors or artifacts depending on the complexity of the algorithm. However, due to the parallax effect or other effects resulting from camera configuration, artifacts or errors typically occur along a seam where the image segments are stitched together. In general, the parallax effect is the displacement or difference in the apparent position of an object viewed from two different lines of sight. Thus, the artifacts or errors may result from imperfect image mapping where an object appearing in the fields of view of multiple cameras looks askew, broken or otherwise incorrect when images from the multiple cameras are combined together.

To account for these artifacts or errors, systems and methods are disclosed that detect artifacts and mask the artifacts with artistic effects or graphical elements that cover the artifacts or errors and provide a more pleasing visual effect in a resulting image. Artifacts are detected based on an amount of error in a stitched or combined image, for example, a measured difference between neighboring pixel values or a weighted difference in pixel values, gradients and transform domains. This difference (or delta), which may be produced by a stitching algorithm or determined separately, may then be compared to a threshold to estimate how good or bad the stitch looks from an end user perspective. Essentially, the larger the error the more likely a mask is applied or the stronger/more prominent a mask is applied. Thus, the systems and methods provide a quick way to hide errors, or even accentuate them in a way to look purposeful.

Examples of masks include, for example, transition effects typically used in video editing applications, graphical elements such as images of objects, animations, text, etc. that are placed over the artifacts. Such masks may also be applied to areas with no or small artifacts to make the addition of the masks to the image appear more natural. Additionally, selection of the mask(s) applied may be enhanced by determining a type of event or scene that is being captured. In this respect, masks appropriate for different decorative motifs for different situations (i.e., outdoors, parties, graduations, indoors, offices, schools, etc.) may be applied. For example, it may be more appropriate to display a mask of a balloon, streamer, cartoon character/ super hero flying over the artifact areas in a children's birthday party scene; a firework may also be more appropriate in New Year's Eve scene, etc. The user may also have control over whether or not a mask is inserted, what type of mask(s) are used, etc.

FIG. 1 illustrates an overview of a system 100 for implementing embodiments of the disclosure. The system 100 includes a capture device 102 and a user device 104 (such as smartphone) that may be in communication with one another over a network (such as a Bluetooth or wireless connection). In this embodiment, the capture device 102 includes a plurality of cameras 106 and may capture image data of an event or scene. The cameras 106 may be positioned such that the field of view of adjacent camera's 106 overlap to allow the capture device 102 to capture a 360 degree view of the scene. The image data may be a single image, a plurality of images captured in succession, a video, etc.

In general, the capture device 102 captures image data, illustrated as block 108. In this example, the capture device 102 includes four cameras 106. A linear view of four segments one from each camera are illustrated as segments 110a-110d. As illustrated, adjacent segments overlap one another. For example, segments 110a and 110b overlap in a region 112a; segments 110b and 110c overlap in a region 112b; segments 110c and 110d overlap in a region 112c; and segments 110d and 110a overlap in a region 112d.

After capturing the image data, the capture device 102 stitches the segments 110a-110d together in appropriate order, illustrated as block 114. The stitching may result in seams, for example seams 116a-116d joining the corresponding segments together in the corresponding overlap regions. During or after the stitching, the capture device 102 may also calculate errors (i.e., a difference or weighted difference between pixel values, gradients and transform domains) in the overlap regions, illustrated as block 118.

The capture device 102 may also make a determination as to whether the error is an error that should be masked or left alone, illustrated s block 120. For example, in certain situations, it may be desirable to leave an error alone (such as when the error occurs on a face of a person depicted in the image data) so as to not take away from the scene or event depicted in the image data. The capture device 102 may also identify artifacts by comparing the errors to a threshold, and identify an artifact when an error is greater than the threshold, illustrated as block 122. The capture device 102 may then insert a mask to cover the identified artifacts, illustrated as block 124.

For illustrative purposes, the capture device 102 may identify a first artifact 126a corresponding to an error in the overlap region 112a, and a second artifact 126b corresponding to an error in the overlap region 112c. The capture device 102 may insert a mask 128a and 128b (flowers in this example) overlaying the first and second artifacts 126a, 126b, respectively. In one example, the insertion of the mask may include identifying pixel values that correspond to an error or artifact (such as a first pixel value corresponding to the first artifact), and replace the pixel values corresponding to the error or artifact with new pixel values associated with the graphical element. Thus, for purposes of displaying the image data on a display, the pixels corresponding to the error or artifact are changed to display the pixels corresponding to the graphical element that is used to mask the error or artifact.

Figure 2:
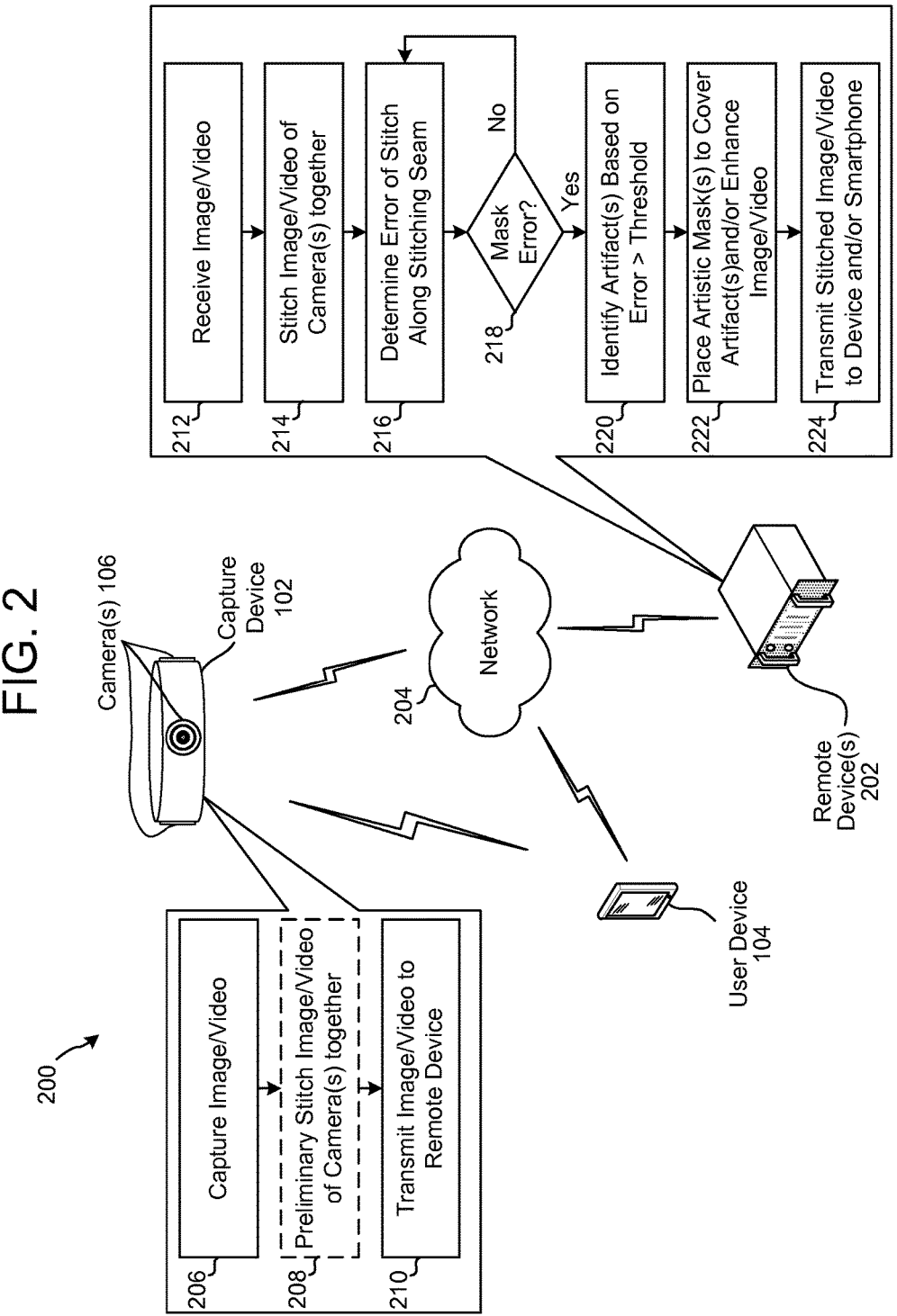
FIG. 2 illustrates an overview of a system for implementing embodiments of the present disclosure.

In some embodiments, processing the captured image data may involve significant computational resources (for example, analyzing the captured image data, stitching segments together, identifying artifacts, and applying mask(s)), in terms of both storage and processing power. Thus, the capture device 102 may transmit the captured image data to a remote device for processing. FIG. 2 illustrates an overview of a system 200 for implementing embodiments of the disclosure. The system 200 includes the capture device 102, the user device 104, and a remote device 202 (such as a remote server) in communication with one another over a network 204. In an example, the capture device 102 captures image data, illustrated as block 206, and transmits the image data to the remote device 202, illustrated as block 210. The capture device 102 may transmit the image data directly to the remote device 202, or may transmit the image data to the user device 104, which then transmits the image data to the remote device 202.

In some embodiments, the capture device 102 may preliminarily stitch the segments of the image data together, illustrated as block 208, and then transmit the preliminarily stitched image data to the remote device 202. In these embodiments, full overlap regions from adjacent segments are stored on the capture device 102. Alternatively, if a stitch has already been performed and the data transmitted, not all of the image/data is required to be transmitted to the remote device 202 for processing. For example, if a seam consists of a simple vertical line stitch, dynamic or constant (as described in further detail below), the stitched overlap area includes two halves and a blend region around a blend line of the seam. An extra overlap area, wider than the original overlap, with the segments reversed may be generated and transmitted. This enables the remote device 202 to reconstruct the segments.

The remote device 202 receives the image data, illustrated as block 212, and stitches the segments of the image data together in the appropriate order, illustrated as block 214. As mentioned above, the stitching may result in seams corresponding to the overlap regions. During or after the stitching, the remote device 202 calculates errors (i.e., a difference or weighted difference between pixel values, gradients and transform domains) in the overlap regions, illustrated as block 216. The remote device 202 may also make a determination as to whether the error is an error that should be masked or left alone, illustrated s block 218. For example, in certain situations, it may be desirable to leave an error alone (such as when the error occurs on a face of a person depicted in the image data) so as to not take away from the scene or event depicted in the image data. When the error is such that it should or may be masked, the remote device 202 may identify artifacts by comparing the errors to a threshold, and identify an artifact when an error is greater than the threshold, illustrated as block 220. The remote device 202 may then insert a mask overlaying the identified artifacts, illustrated as block 222. In one example, the insertion of the mask may include identifying pixel values that correspond to an error or artifact (such as a first pixel value corresponding to the first artifact), and replace the pixel values corresponding to the error or artifact with new pixel values associated with the mask. Thus, for purposes of displaying the image data on a display, the pixels corresponding to the error or artifact are changed to display the pixels corresponding to the mask to prevent display of the error or artifact.

The remote device 202 may send the processed image data (including the masks) to the user device 104 and/or the capture device 102, illustrated s block 224. The remote device 202 may also store the data in a remote database that is accessible by a user via the capture device 102 and/or the user device 104.

The image data may also be stored in the capture device 102. For example, the capture device 102 may simply save the stitched frame. Alternatively, if the capture device 102 has a limited buffer, the frame may be split in half, and each half may be stored, one below the other.

Figure 3:
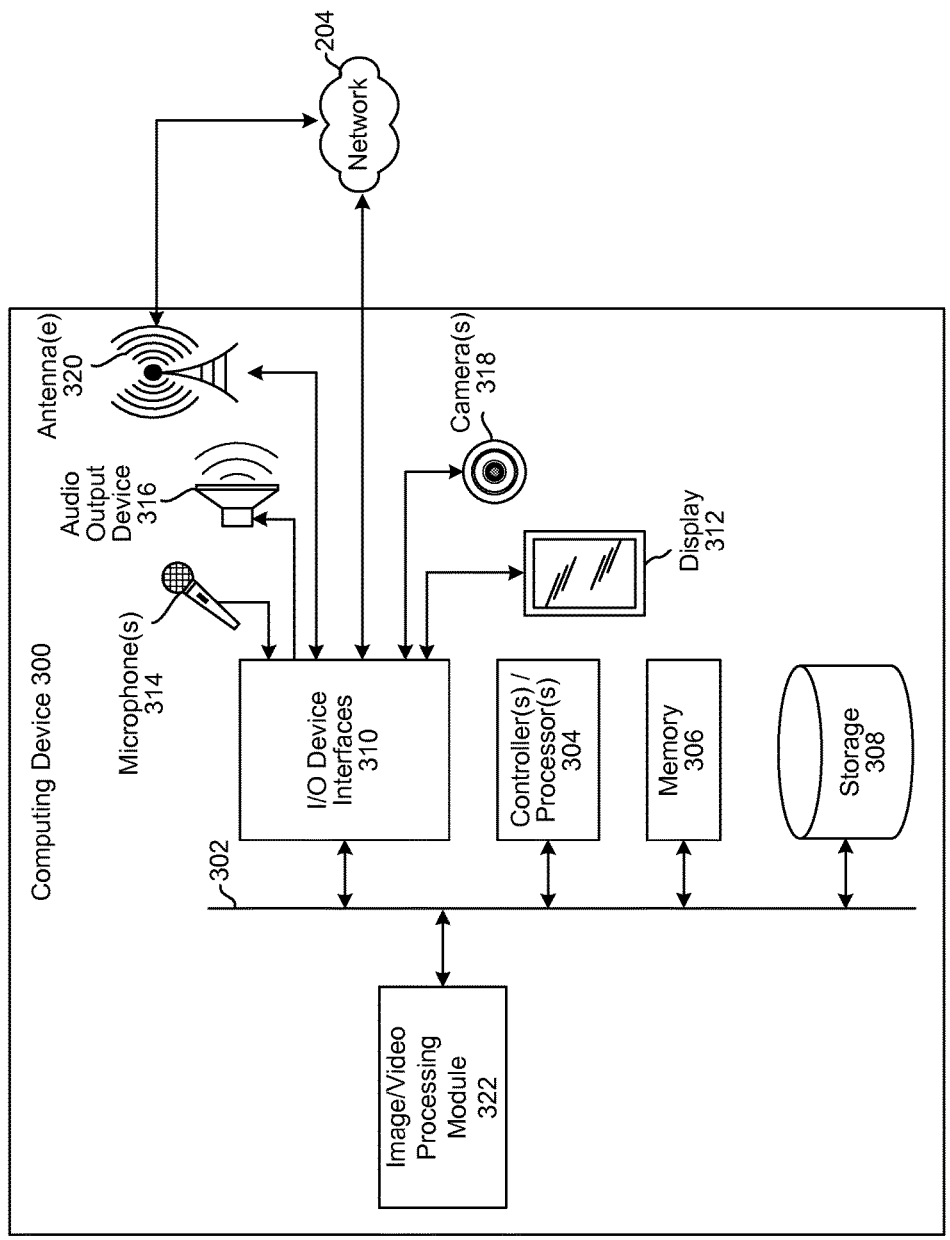
FIG. 3 is a block diagram conceptually illustrating an exemplary device according to embodiments of the present disclosure.

FIG. 3 is a block diagram conceptually illustrating example components of a computing device 300. The computing device 300 may be exemplary of the capture device 102, user device 104 and/or remote device 202. In operation, the computing device 300 may include computer-readable and computer-executable instructions that reside on the computing device 300, as described below.

The computing device 300 may include an address/data bus 302 for conveying data among components of the computing device 300. Each component within the computing device 300 may also be directly connected to other components in addition to (or instead of) being connected to other components across the bus 302.

The computing device 300 may include one or more controllers/processors 304 that may each include a central processing unit (CPU) for processing data and computer-readable instructions, and a memory 306 for storing data and instructions. The memory 306 may include volatile random access memory (RAM), non-volatile read only memory (ROM), non-volatile magnetoresistive (MRAM) and/or other types of memory. The computing device 300 may also include a data storage component 308, for storing data and controller/processor-executable instructions (e.g., instructions to perform the algorithms and methods illustrated and described herein). The data storage component 308 may include one or more non-volatile storage types such as magnetic storage, optical storage, solid-state storage, etc. The computing device 300 may also be connected to removable or external non-volatile memory and/or storage (such as a removable memory card, memory key drive, networked storage, etc.) through input/output device interfaces 310.

Computer instructions for operating the computing device 300 and its various components may be executed by the controller(s)/processor(s) 304, using the memory 306 as temporary "working" storage at runtime. The computer instructions may be stored in a non-transitory manner in non-volatile memory 306, storage 308, or an external device. Alternatively, some or all of the executable instructions may be embedded in hardware or firmware in addition to or instead of software.

The computing device 300 includes input/output device interfaces 310. A variety of components may be connected through the input/output device interfaces 310, such as a display 312, one or more audio capture device(s) (such as a microphone or an array of microphones 314), an audio output device for producing sound (such as speaker(s) 316), camera(s) 318, and/or other such components. The input/output device interfaces 310 may also include an interface for an external peripheral device connection such as universal serial bus (USB), FireWire, Thunderbolt or other connection protocol. The input/output device interfaces 310 may also include a connection to one or more networks 204 via an antennae 320, Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The display 312 may be a display of any suitable technology, such as a liquid crystal display, an organic light emitting diode display, electronic paper, an electrochromic display, a cathode ray tube display, a pico projector or other suitable component(s). The camera 318 and the display 312 may be integrated into the computing device 300 or may be separate.

The computing device 300 further includes an image processing module 322. The image processing module 322 and/or controller(s)/processor(s) 304 receives captured image data and processes the captured image data. For example, the image processing module 322 and/or controller(s)/processor(s) 304 stitches segments of the image data together, identifies artifacts by comparing errors to a threshold, and identifies an artifact when an error is greater than the threshold. The image processing module 322 and/or controller(s)/processor(s) 304 may also insert a mask over the identified artifacts, as described in further detail below.

The computing device 300 may include all or a subset of the components described above. It should be appreciated that each of the methods described with reference to FIGS. 1-2 and 3-12B may be combined with one or more of the other methods, and one or more steps of a methods may be incorporated into the other methods. Further, one or more of the components described above with reference to FIG. 3 may be used to perform the steps of the methods described with reference to FIGS. 1-2 and 3-12B.

FIGS. 4-7 illustrate exemplary stitching methodologies according to embodiments of the present disclosure. It should be appreciated that the image data may be of different formats, for example, an image may be a JPEG, GIF, BMP, MPEG, and the like. Further, the quality and resolution of the images may vary from one application to another. Referring to FIG. 4, a frame 400 including multiple segments 402*a-d* may be stitched together. Each segment may correspond to an image segment captured from a different angle at substantially the same time as the other image segments and stitched together in cylindrical space to provide a panoramic and/or 360 degree view of an event or object. In this example, a constant position blending type stitching technique is illustrated. In general, vertical stitch lines 404*a*-404*d* are selected at constant positions between the segments 402*a*-402*d* (for example, at a center of an overlap region of adjacent segments). Each segment is then placed in corresponding order. For example, the segment 402*a* (corresponding to a first camera) is placed on a left of segment 402*b* (corresponding to a second camera); the segment 402*b* (corresponding to the second camera) is placed on a left of segment 402*c* (corresponding to a third camera); the segment 402*c* (corresponding to the third camera) is placed on a left of segment 402*d* (corresponding to a fourth camera), etc. A fixed size gradient may also be added to merge the images more seamlessly ("alpha blending" as known in the art). In some situations, this method of stitching can produce an undesirable "ghosting" effect resulting in an artifact, which may be masked using an artistic mask.

In another example, a dynamic line carving type stitching technique may be used. In general, stitch lines 404*a-d* are selected at dynamic positions that are based on the difference between adjacent segments 402*a*-402*d*. Essentially, the stitch lines 404*a-d* are selected at blend positions that minimizes error. Each segment 402*a*-402*d* is then placed in corresponding order. In some situations, for example, in complex frames with a high level of detail in the overlap region, unpleasant artifacts, similar to those created by the constant position type stitching, may be produced. In these situations, the artifacts may be masked using an artistic mask.

Referring to FIGS. 5 and 6, frames 500, 600 each including four segments 502*a-d*, 602*a-d*, respectively, are illustrated. In these examples, the corresponding scenes 502*a-d* and 602*a-d*, respectively, are stitched together at seam lines 504*a-d* and 604*a-d*, respectively, using seam carving type techniques. In general, the seam lines 504*a-d* and 604*a-d*, respectively, are selected at dynamic positions and shapes to minimize errors along the seam lines 504*d-c* and 604*a-d*, respectively. In some situations, for example, in complex frames with a high level of detail in the overlap region, unpleasant artifacts may still be produced. In these situations, the artifacts may be masked using an artistic mask.

Various combinations of the above stitching techniques may also be employed. For example, referring to FIG. 7, a frames 700 including four segments 702*a-d* is illustrated. In this example, each seam line may be selected using a one or more techniques. For example, seams line 704*a* and 704*b* may be computed using a dynamic seam carving type technique, and seam lines 704*c* and 704*d* may be computed using a constant position blending type stitching technique and/or dynamic line carving type stitching technique.

It should also be appreciated that when stitching video segments a smoothing technique may also be employed to smooth movement of the seam lines throughout the video. Without such a technique, objects may rapidly switch between a distorted and undistorted state, bringing attention to artifacts that may not have been noticeable in the still image/frame stitch. Any of the stitching techniques may also include a time component, O(mn), where n and m are the number of pixel rows and columns in the overlap region of the image, respectively.

In the techniques described above, the stitch may be computed in such a way that the background is objects are aligned while nearer objects are subject to larger parallax artifacts. Alternatively, the stitch may be computed in such a way that the nearer objects are aligned while background objects are subject to larger parallax artifacts (i.e., using a stitching distance corresponding to a salient object in the scene). When this is done, the artifacts are transferred to the background sections of the scene. The stitching distance corresponding to the object may be determined by cross correlating the overlap regions and finding a point at which the segments best match. This may be performed prior to the application of the stitching technique so that artifacts in the background are reduced while at the same time, any distortions due to the stitching seam appear in the background and not in the salient object.

In other aspects, high level scene analysis techniques may be used to minimize errors. For example, facial recognition, object recognition, text recognition, edge detection techniques, etc., may be used as an input to the stitching technique. Using these techniques, the objects, faces and/or persons, banners, signs, etc. may be identified. In an example, face recognition, and detection may be used to identify faces and prevent faces in the scene from becoming distorted, for example, by stitching around the faces. Motion cues may also be used as indicators of salient objects which should be stitched around.

FIG. 8 is a block flow diagram illustrating an exemplary method 800 of stitching image data and applying masks to artifacts. When the capture device 102 is performing stitching and applying masks, one or more of the following steps may be performed by the capture device 102. When the image data is transmitted to the remote device 202, the remote device 202 may perform one or more of the following steps.

In block 802, the device determines a probability of error (also referred to as an error rate—for example 5 errors/1 frame). This error rate may be determined or estimated based on the stitching of previous image data or stored training data. For example, a compilation of previously stitched image data bay be stored in a database. An error of each frame may be determined, and an average error rate may be determined from the errors from each previous frame. This error rate may be used as an initial rate to start with, but modified as a current frame is stitched together. The remote device 204 may determine the error rate. When the capture device 102 is performing the stitching and applying masks, the capture device 102 may determine the error rate or may receive the error rate from the remote device 204.

The device generates masks corresponding to the error rate, during or after the capture of image data, illustrated as block 804, and places the masks randomly on the segments of the image data, illustrated as block 806. This allows for masks to be added to the image data quickly, without significant delay. For example, the masks may be initially applied randomly and then moved to cover artifacts as the artifacts are detected. When more masks are generated than the amount of artifacts identified, the remaining masks may be placed randomly or may simply be removed from the image data. The masks may be selected by the device, or by a user of the device, as described in further detail with reference to FIG. 9.

The device stitches the segments of the image data together in the appropriate order, illustrated as block 808. Any of the techniques described above may be used to stitch the segments. For example, the device may apply facial recognition and object recognition techniques, as known in the art, to detect faces and objects. The device may then stitch segments of the image data together by stitching around the faces and objects in the segments. This minimizes the severity and number of potential artifacts that may be result in the stitched frame of the image data.

The device may then identify artifacts in the stitched frame of the image data, illustrated as block 810. The artifacts may be identified based on an amount of error resulting from the stitching, as described in further detail with reference to FIG. 10. The device may also determine whether the artifact should actually be masked, illustrated as block 812. For example, in certain situations, it may be desirable to leave an artifact alone (such as when the artifact occurs on a face of a person depicted in the image data) so as to not take away from the scene or event depicted in the image data. When the artifact is not to be masked, no mask is placed over the artifact, and the process continues to determine errors and identify artifacts, if any.

When the artifact is to be masked, the device may then place the masks over the identified artifacts, illustrated as block 814, to hide the artifacts. The device may also update the error rate to a second error rate corresponding to the current image data being stitched based on the identified artifacts, illustrated as block 816, and the process may continue for subsequent stitching of the image data. By creating masks at a rate corresponding to the amount of errors expected (or estimated error rate), the device may be able to cover errors in a relatively quick manner, thus allowing errors in stitched images to be masked reasonably efficiently for eventual output. However, this estimated error rate may cause more or less masks to be generated than needed. Thus, the estimated error rate is updated to the second error rate corresponding to the current image data being stitched, which should be a more accurate error rate for the current image data being stitched.

Figure 9:
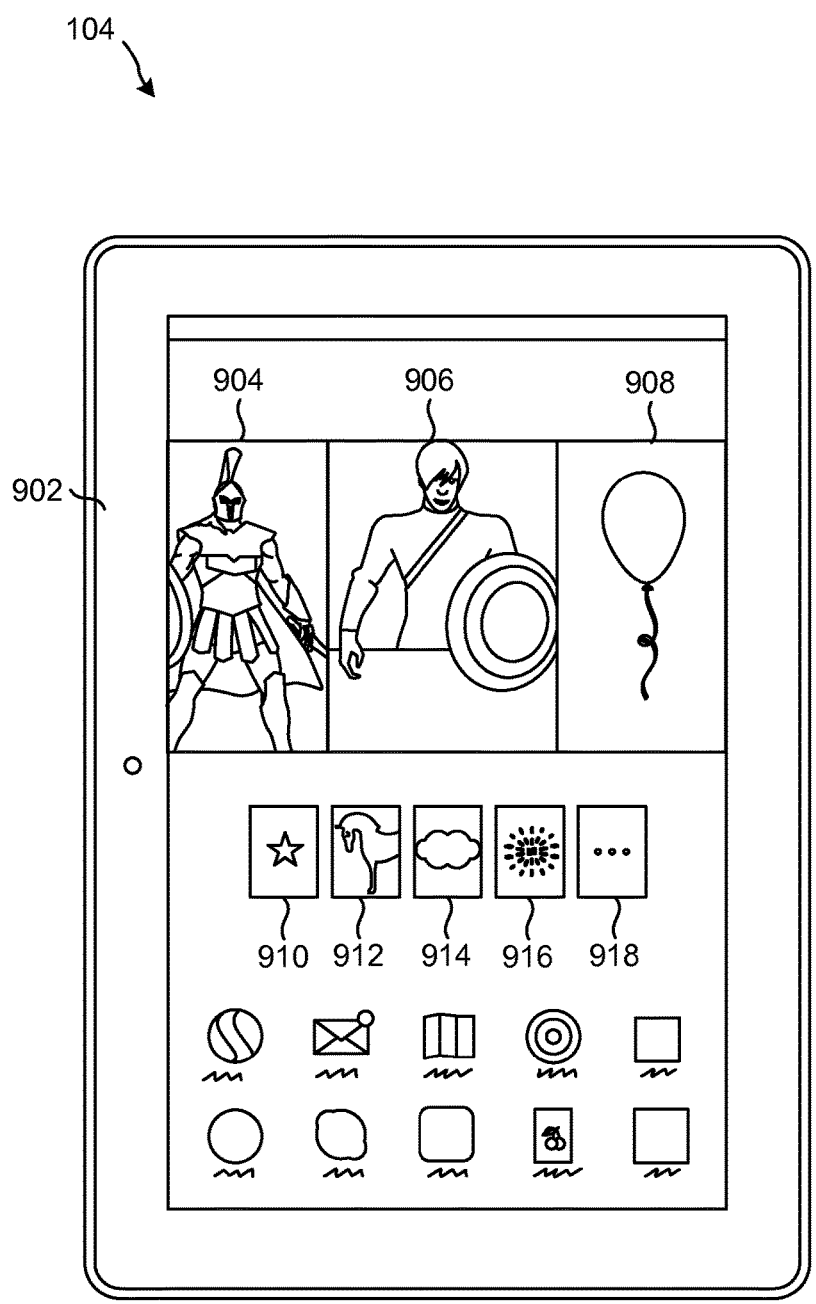
FIG. 9 illustrates an exemplary display interface according to embodiments of the present disclosure.

As mentioned above, the masks may be selected by the device, or by a user of the device. FIG. 9 illustrates an exemplary mask selection interface according to embodiments of the present disclosure. As illustrated, the user device 104 displays an interface 902. The interface 902 may be part of software or firmware residing locally on the user device 104. In other embodiments, interface 902 may be part of software or firmware residing on the capture device 102 and/or the remote device 202 that is accessible by the user device 104 via a network. The user of the user device 104 may also have an account with a user profile allowing the user to access the interface 902, store settings, etc.

The interface 902 may include a plurality of artistic masks 904-918 the user may select for use in masking artifacts or simply for decoration of a scene of the image data. The masks may include any object, transition effect, or other effect that may be integrated into the image data. For illustrative purposes, a first mask 904 corresponds to a warrior, which may be useful in scenes depicting historic sites, a children's event, etc. A second mask 906 corresponds to a super hero, which may also be useful in scenes depicting a children's event, etc. A third mask 908 corresponds to a balloon, which may be useful in scenes depicting various types of celebratory events, etc. A fourth mask 910 corresponds to a star, which may also be useful in scenes depicting various types of celebratory events, astronomy related events, etc. A fifth mask 912 corresponds to a horse, which may be useful in scenes depicting various types of equestrian related events, children's events, etc. A sixth mask 914 corresponds to a cloud, which may be useful in scenes depicting various types of outdoor events, etc. A seventh mask 916 corresponds to a firework, which may be useful in scenes depicting various types of celebratory events (such as a new year eve event or Independence Day event), etc. As can be appreciated, additional mask 918 may also be included. The masks may also be organized in various categories relating to scenes they may likely be used in or have been used in by other.

The interface 902 may also include an option (such as one of the additional selection options illustrated proximal to a bottom of the interface) where the user may input information about a particular scene or event (or otherwise tag an event or scene) that is or has been captured. This may allow the device processing the image data to understand what type of scene or event is captured in the image data and apply masks that correspond to the scene or event. The device processing the image data may also apply facial recognition, object recognition, and scene/event recognition techniques to understand a scene/event and apply appropriate masks accordingly. The interface may also allow the user to turn off an automatic artifact masking option, thereby telling the device processing the image data to leave all artifacts as is. The interface may also allow the user to upload masks, purchase masks, sell masks, send the image data to a service to have artifacts corrected, etc.

FIG. 10 is a block flow diagram illustrating an exemplary method 1000 of identifying artifacts according to embodiments of the disclosure. When the capture device 102 is performing stitching and applying masks, one or more of the following steps may be performed by the capture device 102. When the image data is transmitted to the remote device 202, the remote device 202 may perform one or more of the following steps.

In block 1002, the device determines an area or location of a stitching seam (for example, between a first and second image that are to be stitched together to form a third stitched image). In general, the technique used to stitch the seams of the segments of the image data provides the location. The device determines where the device stitched two segments together, as well as the locations of the pixels within the overlap region that were compared to determine where to stitch. These may be determined ahead of time as the device may generally know where the image segments join as a result of camera locations being fixed relative to each other. The device also calculates one or more errors along the seam, illustrated as block 1004. The errors may be a delta or difference in pixel values that are or were compared to determine where to stitch. Again, the device knows the locations of such pixels by virtue of the technique used to stitch the seam. For example, the device may determine a difference of at least one of color, gradient, location, or transformation of a first pixel value in a first image between a second pixel value in a second image in the overlapping region of the first and second images.

The device then compares the one or more errors to a threshold, illustrated as block 1006. The error may be a delta between the pixel values, a probability or matching percentage of the compared pixel values, and average error of multiple pixel values, etc. Similarly, the threshold may be a probability or matching percentage. In one example, the threshold may be about 20% (it should be appreciated that this threshold may be increased or decreased as desired and based on the application). When the error is less than the threshold, the device may decide that the error is small enough that it will not provide an unappealing visual look to a viewer, and it should not be masked. Thus, the device may not identify the location corresponding to the error as an artifact, illustrated s block 1008. One situation where the error would likely be small is where the stitching seam extends across a solid colored wall illustrated in the image data. This is because the solid colored pixel values would likely match in terms of color and even if they are not exactly aligned, a viewer would not be able to notice.

On the other hand, when the error is greater than the threshold, the device may decide that the error is large enough that it should be masked to provide a more appealing visual look to a viewer. Thus, the device may identify the location corresponding to the error as an artifact, illustrated s block 1010. The device may also make a determination of whether the artifact should actually be masked, illustrated as block 1012. For example, in certain situations, it may be desirable to leave an artifact alone (such as when the artifact occurs on a face of a person depicted in the image data) so as to not take away from the scene or event depicted in the image data. When the artifact is not to be masked, no mask is placed over the artifact, and the process continues to determine errors and identify artifacts, if any.

When the artifact is to be masked, the device may place a mask in the location corresponding to the artifact, illustrated as block 1014. One situation in which the error would likely result in an artifact is where the stitching seam extends across a detailed colorful artistic oriental rug. This is because numerous pixel values with differing color may not align exactly, thereby providing an unpleasant look to a viewer.

Prior to placing the mask, the device may receive information via user input about the scene/event or what type of mask to place over the artifact. As mentioned above, the device may also employ various techniques to analyze the scene or event captured in the image data. In this regard, the device may identify faces, objects, a type of scene, a type of event, etc. in the image data, illustrated as block 1016. This allows the device to select the mask most appropriate to the image data that should be placed over the artifact or determine not to place a mask over the artifact.

The mask may also be interactive, and the device may allow the user to interact with the mask to remove the mask, change the mask, upload a new mask, have the artifact corrected, etc., illustrated as block 1018. In an example, the user may select the artifact or mask, which may be an advertisement or option to send the image data to a third party to correct the mask, optionally for a fee. In another example, the user may be above to upload a mask, optionally for a fee. The interactive nature of the artifact or mask may also allow for users to upload masks using an application that allows the user to purchase masks and/or sell the mask to others who desire to use the mask.

FIGS. 11A and 11B illustrate an exemplary masking of artifacts according to embodiments of the present disclosure. As illustrated in FIG. 11A, a frame 1100 is illustrated having two stitching seams 1102a and 1102b. In this example, the mountain illustrated, may be the reference point in the image, and the stitching distance may be determined to stitch the mountain accurately, while pushing artifacts to the background (i.e., the sky and clouds). Thus, the portions of the clouds in the locations represented by dashed ovals 1104a and 1104b are misaligned. This may result in an error greater than the threshold, and could provide an unpleasant look to a viewer. Thus, these locations may be masked.

In this example, the device may determine that the objects that are misaligned are clouds using object recognition techniques. Knowing that the misaligned objects are clouds, the device may insert a cloud type mask element over the artifacts to provide a more natural look to the viewer. For example, as illustrated in FIG. 11B, a first cloud 1106a may be inserted over the first artifact in the first location 1104a; and a second cloud 1106b may be inserted over the second artifact in the second location 1104b. It should be appreciated that the clouds 1106a and 1106b are illustrated as dashed for illustration purposed only.

Figure 12B:
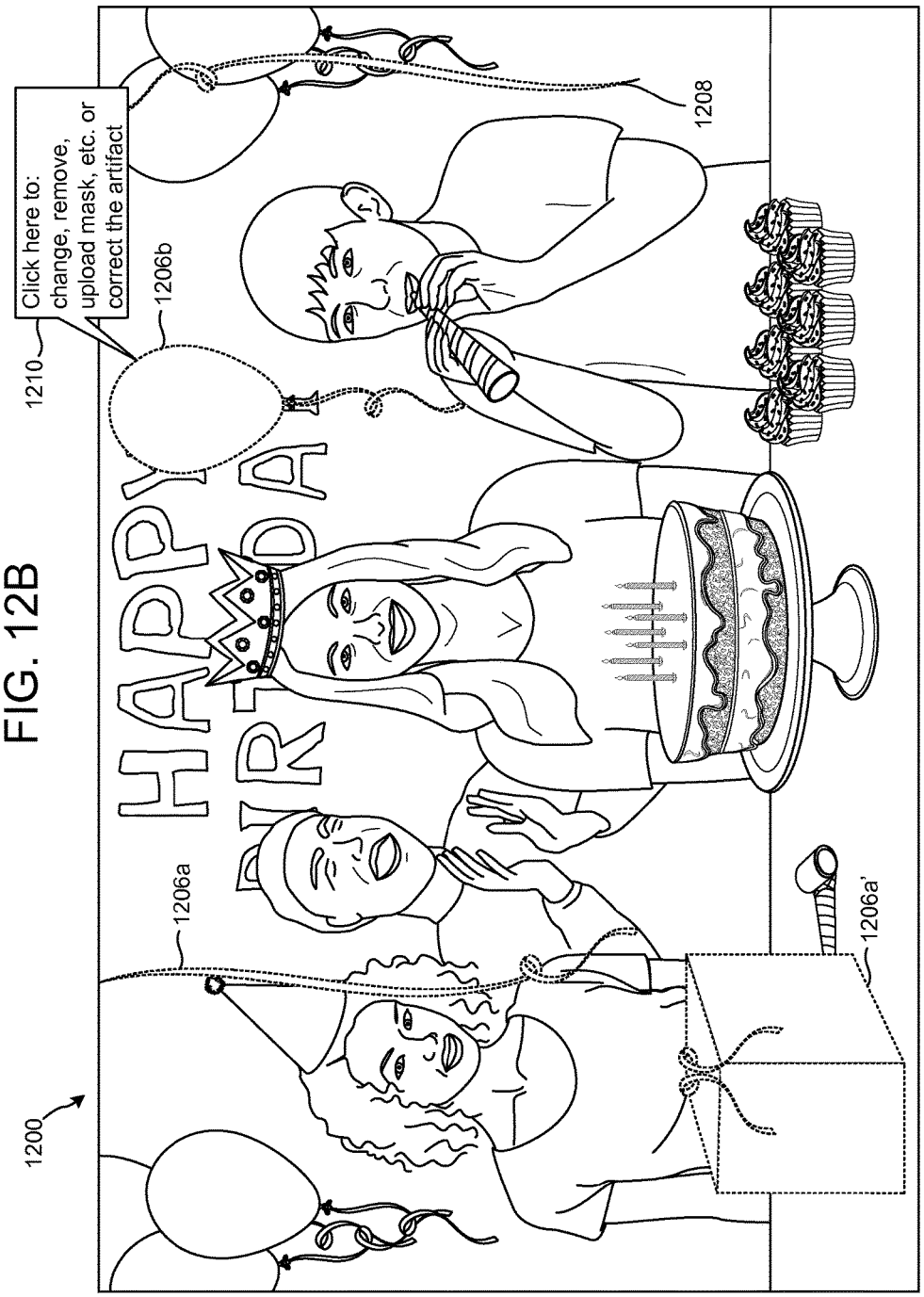
FIG. 12B illustrates the exemplary image of FIG. 12A with the artifacts masked according to embodiments of the present disclosure.

FIGS. 12A and 12B illustrate another exemplary masking of artifacts according to embodiments of the present disclosure. As illustrated in FIG. 12A, a frame 1200 is illustrated having two stitching seams 1202a and 1202b. In this example, the scene relates to a birthday party. The device may determine that the scene relates to a birthday party using various types of recognition techniques known in the art. The device may also use facial recognition techniques to stitch around faces. However, in this example, this results in a misalignment of a person's shoulder/arm and part of a table a cake is sitting on, as illustrated in the location represented by dashed oval 1204a. Additionally, with respect to the stitching seam 1202b, the device may push artifacts to the background (i.e., the back wall with "HAPPY BIRTHDAY"). In this situation, the ends of the two "Y"s are misaligned in the locations represented by dashed oval 1204b. These misalignments may result in errors greater than the threshold, and could provide an unpleasant look to a viewer. Thus, these locations may be masked.

In this example, the device may know that the scene is a birthday party, and select masks, such as, gifts, balloons, streamers, etc., to place over the artifacts. For example, as illustrated in FIG. 12B, a streamer 1206a and a gift 1206a' may be inserted over the first artifact in the first location 1204a; and a balloon 1206b may be inserted over the second artifact in the second location 1204b. Additionally, to make the addition of the masks appear more natural, one or more additional mask may be added. For example, a second streams 1208 may be inserted, purely for aesthetic reasons. Again, it should be appreciated that the masks are illustrated as dashed for illustration purposed only.

The masks, such as the balloon 1026b may also be interactive. For example, a user may hover over the balloon 1026b, and a prompt 1210 may appear that allows the user to select or click on the balloon 1026b to change the balloon 1026b to a different mask, remove the balloon 1026b, upload a new mask to replace the balloon 1026b, purchase a new mask to replace the balloon 1026b, etc. The user may also click on the balloon 1026b to send the image data to an editing service to have the artifact(s) that are masked by the balloon 1026b corrected. It should be appreciated that any mask may be interactive and any service offered may be free or cost a fee.

When the image data relates to a video, masks may be applied to one or more frames of the video (each frame may include image data from more than one camera stitched together), and/or prior to and after the frame in which the error or artifact occurs. This provides a more seamless video and minimizes the situation where an artifact or mask appears and disappears across individual frames of the video when an artifact is present.

In an example, the device may determine an artifact is present in a first frame, the artifact is not present in a second frame, and the artifact re-appears in a third frame. This can create a noise. For example, if masks were only applied in the first and third frames, the mask may appear, disappear, and then reappear creating a noise in the video. To account for and correct this noise, the mask may be applied to all three frames to make sure the mask does not appear and disappear across the individual frames. Rather, the decision of placing and moving the mask may be made based on a threshold. For example, a moving object in the image data may have a stitching artifact and the artifact may appear in more than 50% of the frames (for example, 5,000 frames). Since the artifact appears in more than 50% of the frames, the device may place the artifact over the artifact and keep it there for the entire set of frames.

There can also be multiple thresholds for the purpose of continuity. For example if the artifact only appears for a duration of 15 frames, there may be a threshold number of frames (including frames before and after the frame(s) in which the artifact appears) into which the mask is placed to prevent the mask from appearing and disappearing. In this respect, the placement of the mask may look purposeful, rather than some image that flashes on and off in the video.

Figure 13:
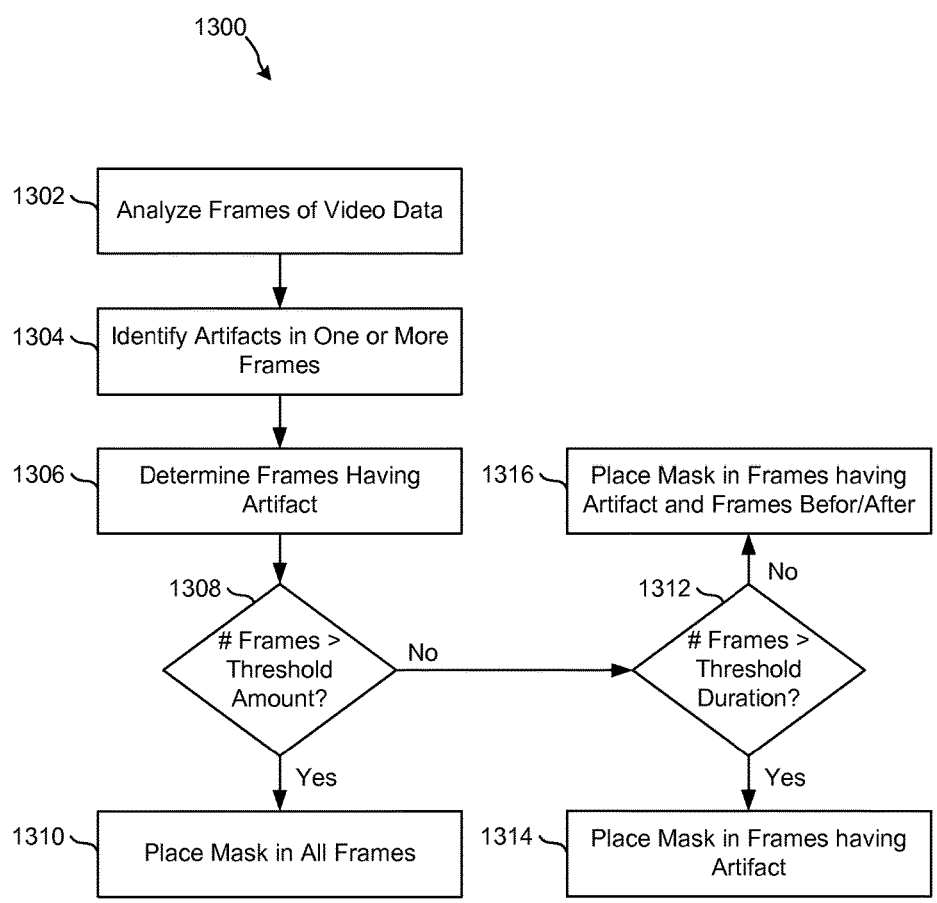
FIG. 13 illustrates another exemplary method according to embodiments of the present disclosure.

FIG. 13 illustrates a method of applying masks in accordance with this methodology. In block 1302, the device analyzes frames of the image data (i.e., a video). The device identifies artifacts in one or more of the frames, illustrated as block 1304, and determines the frames in which the artifacts occurs, illustrated s block 1306. The device may also determine whether the number or amount of frames that include the artifact is greater than a threshold amount, illustrated as block 1308. For example, if there are a total of 10 frames (each frame including image data from more than one camera stitched together), and an artifact is identified in 50% of the frames (such as frames 1, 2, 6, 7, and 8), the percentage of the frames (i.e., 50%) may be greater than the threshold amount. When the amount of frames that include the artifact is greater than a threshold amount, the device may place a mask over the artifact in each frame of the video (for example, all 10 frames in this example), illustrated as block 1310. This ensures the mask does not appear and disappear across the individual frames.

The device may also determine whether the number or amount of frames that include the artifact is greater than a threshold duration, illustrated as block 1312. For example, if there are a total of 10 frames, and an artifact is identified in frames 2-5, the number of the frames may be greater than the threshold duration (which may be set high enough to ensure a mask does not appear for a short duration and then disappear causing a negative impact on a viewer of the video). When the amount of frames that include the artifact is greater than the threshold duration, the device may place a mask over the artifact in only those frames of the video (for example, frames 2-5 in this example), illustrated as block 1314.

On the other hand, when the amount of frames that include the artifact is less than the threshold duration (for example, frames 3-5), the device may place a mask over the artifact in those frames of the video as well as one or more frames before and after those frames (for example, frames 1-8 in this example), illustrated as block 1316. This is done to ensure a mask does not appear for a short duration and then disappear causing a negative impact on a viewer of the video.

The masks may also be used to hide or cover up undesirable areas of an image in the image data that are not caused by stitching effects. For example, glares may be introduced into imaged by a camera or external effects that make the image look unpleasant to a viewer. In these situations, masks may also be used to cover such undesirable areas.

As illustrated in FIG. 14, multiple devices (102, 104, 202, etc.) may contain components of the system and the devices may be connected over the network 204. The network 204 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies. Devices may thus be connected to the network 204 through either wired or wireless connections. Network 204 may include a local or private network or may include a wide network such as the internet. For example, the capture device 102, user device 104, remote device 202, networked camera(s) 1402 (which may also include one or more microphones), networked microphone(s) 1404 (or networked microphone array(s), not illustrated) may be connected to the network 204 through a wireless service provider, over a WiFi or cellular network connection or the like. Other devices, such as tablet computer 1406, desktop computer 1408, and/or laptop computer 1410 may connect to the network 204 through a wired connection or wireless connection.

In an embodiment, the techniques described above are described and illustrated in connection with divergent camera sets (i.e., cameras that point and capture image data in differing directions). However, it should be appreciated that the techniques described herein may also be applied in connection with convergent camera sets (such as cameras 1402) that point and capture image data of a common area.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving video data from a device, the video data comprising first video data from a first camera and second video data from a second camera, wherein the first video data represents a first view of a scene, the second video data represents a second view of the scene that is different than the first view, and a portion of the first video data and a portion of the second video data represent a same portion of the scene;
   generating first image data using a first frame of the first video data and a first frame of the second video data;
   generating second image data using a second frame of the first video data and a second frame of the second video data;
   determining a first error corresponding to mismatching pixel values of the first frame of the first video data and the first frame of the second video data;
   determining a second error corresponding to mismatching pixel values of the second frame of the first video data and the second frame of the second video data;
   determining that the first error is greater than a threshold value;
   determining that the second error is less than the threshold value;
   identifying an object in the scene, wherein the object is represented in the first image data;
   selecting first graphical element data to substantially correspond to the object;

generating third image data by adding the first graphical element data to the first image data at a location corresponding to the first error; and generating fourth image data by adding the first graphical element data to the second image data at a location corresponding to the second error.

2. The computer-implemented method of claim 1, further comprising:

estimating a first error rate, wherein the first error rate corresponds to a number of visual errors estimated to appear in the first image data as a result of joining of the first image data and the second image data;

updating the first error rate to a second error rate corresponding to a number of errors identified in the first image data based on identifying the first error.

3. The computer-implemented method of claim 1, further comprising:

analyzing the video data to identify objects, faces, and text present in the scene;

determining a scene type corresponding to the objects, faces, and text; and wherein selecting the first graphical element data includes selecting the first graphical element data to correspond to the scene type.

4. A computer-implemented method, comprising:

receiving first video data representing a scene;

receiving second video data representing at least a portion of the scene, wherein a portion of the first video data and a portion of the second video data represent a same portion of the scene;

generating first image data using at least a portion of a first frame of the first video data and at least a portion of a second frame of the second video data;

generating second image data using at least a portion of a third frame of the first video data and at least a portion of a fourth frame of the second video data;

determining that a first error value is greater than a threshold value, the first error value representing a first pixel value with respect to a second pixel value, the first pixel value corresponding to a first pixel at a first location in the first frame of the first video data and the second pixel value corresponding to a second pixel at a second location in the second frame of the first video data, the first location corresponding to the second location;

determining that a second error value is less than the threshold value, the second error value representing a third pixel value with respect to a fourth pixel value, the third pixel value corresponding to a third pixel at a third location in the third frame of the first video data and the fourth pixel value corresponding to a fourth pixel at a fourth location in the fourth frame of the second video data, the third location corresponding to the fourth location;

identifying an object represented in the first image data at the first location;

selecting a first graphical element corresponding to the object;

generating third image data by adding, based at least in part on determining the first error value is greater than the threshold value, first graphical element data corresponding to the first graphical element the first image data at the first location; and generating fourth image data by adding the first graphical element data to the second image data at the second location.

5. The computer-implemented method of claim 4, wherein determining the first error value includes determining a difference of at least one of color, gradient, location, or transformation of the first pixel value and the second pixel value.

6. The computer-implemented method of claim 4, further comprising receiving the first video data and the second video data from an image capture device, the first video data representing the scene from a first angle, and the second video data representing the portion of the scene from a second angle.

7. The computer-implemented method of claim 4, further comprising:

determining a first error rate corresponding to a number of visual errors expected to appear in the first image data as a result of generating the first image data; and generating data corresponding to a plurality of graphical elements based at least in part on the first error rate.

8. The computer-implemented method of claim 7, further comprising:

updating the first error rate to a second error rate based on the first error value; and generating a second plurality of graphical elements based at least in part on the second error rate.

9. The computer-implemented method of claim 4, further comprising:

determining a scene type corresponding to the object, wherein the first graphical element further corresponds to the scene type.

10. The computer-implemented method of claim 4, further comprising:

determining a third error value is greater than the threshold value, the third error value representing a fifth pixel value with respect to a sixth pixel value, the fifth pixel value corresponding to a fifth pixel at a fifth location in a fifth frame of the first video data and the sixth pixel value corresponding to a sixth pixel at a sixth location in a sixth frame of the second video data; and generating fifth image data by adding the first graphical element in the third frame at the sixth location.

11. The computer-implemented method of claim 4, wherein generating the third image data further comprising adding a second graphical element at a random location in the first image data.

12. The computer-implemented method of claim 4, further comprising identifying a type of the object of the scene represented in the first image data at the first location, wherein the first graphical element further corresponds to the type of object.

13. The computer-implemented method of claim 4, wherein generating the first image data comprises stitching the first image data and the second image data together, and wherein determining the first error value occurs after stitching the first image data and the second image data together.

14. A device, comprising:

at least one processor; and at least one memory including instructions that, when executed by the at least one processor, cause the device to:

receive first video data representing a scene;

receive second video data representing at least a portion of the scene, wherein a portion of the first video data and a portion of the second video data represent a same portion of the scene;

generate first image data using at least a portion of a first frame of the first video data and at least a portion of a second frame of the second video data;
generate second image data using at least a portion of a third frame of the first video data and at least a portion of a fourth frame of the second video data to form second image data;
determine that a first error value is greater than a threshold value, the first error value representing a first pixel value with respect to a second pixel value, the first pixel value corresponding to a first pixel at a first location in the first frame of the first video data and the second pixel value corresponding to a second pixel at a second location in the second frame of the first video data, the first location corresponding to the second location;
determine that a second error value is less than the threshold value, the second error value representing a third pixel value with respect to a fourth pixel value, the third pixel value corresponding to a third pixel at a third location in the third frame of the first video data and the fourth pixel value corresponding to a fourth pixel at a third second location in the fourth frame of the second video data, the third location corresponding to the fourth location;
identify an object represented in the first image data at the first location;
select a first graphical element corresponding to the object;
generate third image data by adding, based at least in part on the instructions to configure the at least one processor to determine the first error value is greater than the threshold value, first graphical element data corresponding to the first graphical element to the first image data at the first location; and
generate fourth image data by adding the first graphical element data to the second image data at the second location.

15. The device of claim 14, wherein the at least one memory further includes instructions that, when executed by the at least one processor, further cause the device to determine the first error value by determining a difference of at least one of color, gradient, location, or transformation of the first pixel value and the second pixel value.

16. The device of claim 14, wherein the at least one memory further includes instructions that, when executed by the at least one processor, further cause the device to receive the first video data and the second video data from an image capture device, the first video data representing the scene from a first angle, and the second video data representing the portion of the scene from a second angle.

17. The device of claim 14, wherein the at least one memory further includes instructions that, when executed by the at least one processor, further cause the device to:
determine a first error rate corresponding to a number of visual errors expected to appear in the first image data as a result of generating the first image data; and
generate data corresponding to a plurality of graphical elements based at least in part on the first error rate.

18. The device of claim 17, wherein the at least one memory further includes instructions that, when executed by the at least one processor, further cause the device to:
update the first error rate to a second error rate based on the first error value; and
generate a second plurality of graphical elements based at least in part on the second error rate.

19. The device of claim 14, wherein the at least one memory further includes instructions that, when executed by the at least one processor, further cause the device to:
determine a scene type corresponding to the object,
wherein selecting the first graphical element further corresponds to the scene type.

20. The device of claim 14, wherein the at least one memory further includes instructions that, when executed by the at least one processor, further cause the device to:
determine a third error value is greater than the threshold value, the third error value representing a fifth pixel value with respect to a sixth pixel value, the fifth pixel value corresponding to a fifth pixel at a fifth location in a fifth frame of the first video data and the sixth pixel value corresponding to a sixth pixel at a sixth location in a sixth frame of the first video data; and
generate fifth image data by adding the first graphical element in the third frame at the sixth location.

21. The device of claim 14, wherein the at least one memory further includes instructions that, when executed by the at least one processor, further cause the device to:
identify a type of the object of the scene represented in the first image data at the first location,
wherein the first graphical element further corresponds to the type of object.

22. The device of claim 14, wherein the instructions that cause the device to generate the first image data further cause the device to stitch the first image data and the second image data together, and wherein the instructions that configure the at least one processor to determine the first error value execute after the instructions that configure the at least one processor to stitch the first image data and the second image data together.

* * * * *